United States Patent
Michelson

(10) Patent No.: US 9,920,805 B1
(45) Date of Patent: Mar. 20, 2018

(54) WATER-COOLED MAGNETIC BRAKE

(71) Applicant: Technical Film Systems, Inc., Camarillo, CA (US)

(72) Inventor: Manfred G. Michelson, Camarillo, CA (US)

(73) Assignee: Technical Film Systems, Inc., Camarillo, CA (US)

(*) Notice: Subject to any disclaimer, the term of this patent is extended or adjusted under 35 U.S.C. 154(b) by 0 days.

(21) Appl. No.: 15/435,106

(22) Filed: Feb. 16, 2017

(51) Int. Cl.
*F16D 65/78* (2006.01)
*F16D 63/00* (2006.01)
*F16D 121/20* (2012.01)

(52) U.S. Cl.
CPC .......... *F16D 65/78* (2013.01); *F16D 63/002* (2013.01); *F16D 2065/788* (2013.01); *F16D 2121/20* (2013.01)

(58) Field of Classification Search
CPC ........ F16C 65/78; F16C 65/80; F16C 65/807; F16C 65/813; F16D 63/002; F16D 57/002; F15D 2065/784
See application file for complete search history.

(56) References Cited

U.S. PATENT DOCUMENTS

| | | | |
|---|---|---|---|
| 2,791,308 A * | 5/1957 | Barrett | F16D 37/02 192/113.3 |
| 3,076,109 A * | 1/1963 | Cohen | H02K 49/043 310/105 |
| 3,103,605 A * | 9/1963 | Russell | H02K 49/043 310/105 |
| 3,962,595 A * | 6/1976 | Eddens | F16D 57/002 188/159 |
| 4,085,344 A * | 4/1978 | Eddens | F16D 37/02 192/113.23 |
| 4,186,320 A | 1/1980 | Hillman | |
| 4,242,609 A | 12/1980 | Burenkov et al. | |
| 5,238,095 A | 8/1993 | Pedu | |
| 5,445,013 A | 8/1995 | Clayton, Jr. et al. | |
| 6,247,357 B1 | 6/2001 | Clayton, Jr. et al. | |
| 6,680,555 B1 | 1/2004 | Schneider et al. | |
| 8,857,578 B2 | 10/2014 | Bogdanowicz et al. | |
| 2008/0047512 A1 | 2/2008 | Lequesne et al. | |
| 2015/0027828 A1* | 1/2015 | Michelson | F16D 49/00 188/267 |

FOREIGN PATENT DOCUMENTS

| | | |
|---|---|---|
| CN | 2120916 A | 11/1992 |
| CN | 201726298 U | 1/2011 |
| CN | 103758896 A | 4/2014 |
| CN | 104948619 A | 9/2015 |

* cited by examiner

*Primary Examiner* — Vishal R Sahni
(74) *Attorney, Agent, or Firm* — Perkins Coie LLP; Kenneth H. Ohriner

(57) ABSTRACT

A magnetic brake has an outer stator surrounding an inner stator with a circumferential slot between the outer stator and the inner stator. A coil is provided in the inner stator adjacent to the circumferential slot. A drag plate assembly is attached to a rotatable shaft extending centrally through the inner stator. A drag ring joined to the drag plate extends into the circumferential slot. A liquid flow path extends through the a first rotary coupling, the shaft, a plurality of holes in the drag ring, and through a second rotary coupling, for cooling the brake.

14 Claims, 6 Drawing Sheets

WATER-COOLED MAGNETIC BRAKE

BACKGROUND OF THE INVENTION

Magnetic brakes are advantageous for braking rotation and controlling the torque of rotating shafts or other rotating components. For example, during the manufacture or processing of wire, foil, paper, film, or other material wound on a spool or roller, the material may have to be brought to a stop at a predetermined point, such as at end of the roll. In other applications, magnetic brakes may be used to maintain a constant tension on the material during winding and unwinding.

Friction brakes are often not well suited to these uses for several reasons. Friction brakes may not brake evenly. Friction brakes also generate dust, wear out and require maintenance. Magnetic brakes are contact-less and largely avoid these problems, so that magnetic brakes are generally preferred in winding and unwinding systems. In use, magnetic brakes convert kinetic energy into eddy and hysteresis currents which are dissipated and generate heat in the brake. The braking power of the brake is limited by the brake's capability to dissipate heat. Air cooling has been successfully used in the past to dissipate heat in magnetic brakes. However, limitations on air flow through a magnetic brake, and the relatively low specific heat of air, limit the braking power of air cooled magnetic brakes. Accordingly, improved designs are needed.

DETAILED DESCRIPTION OF THE DRAWINGS

Figure 1:
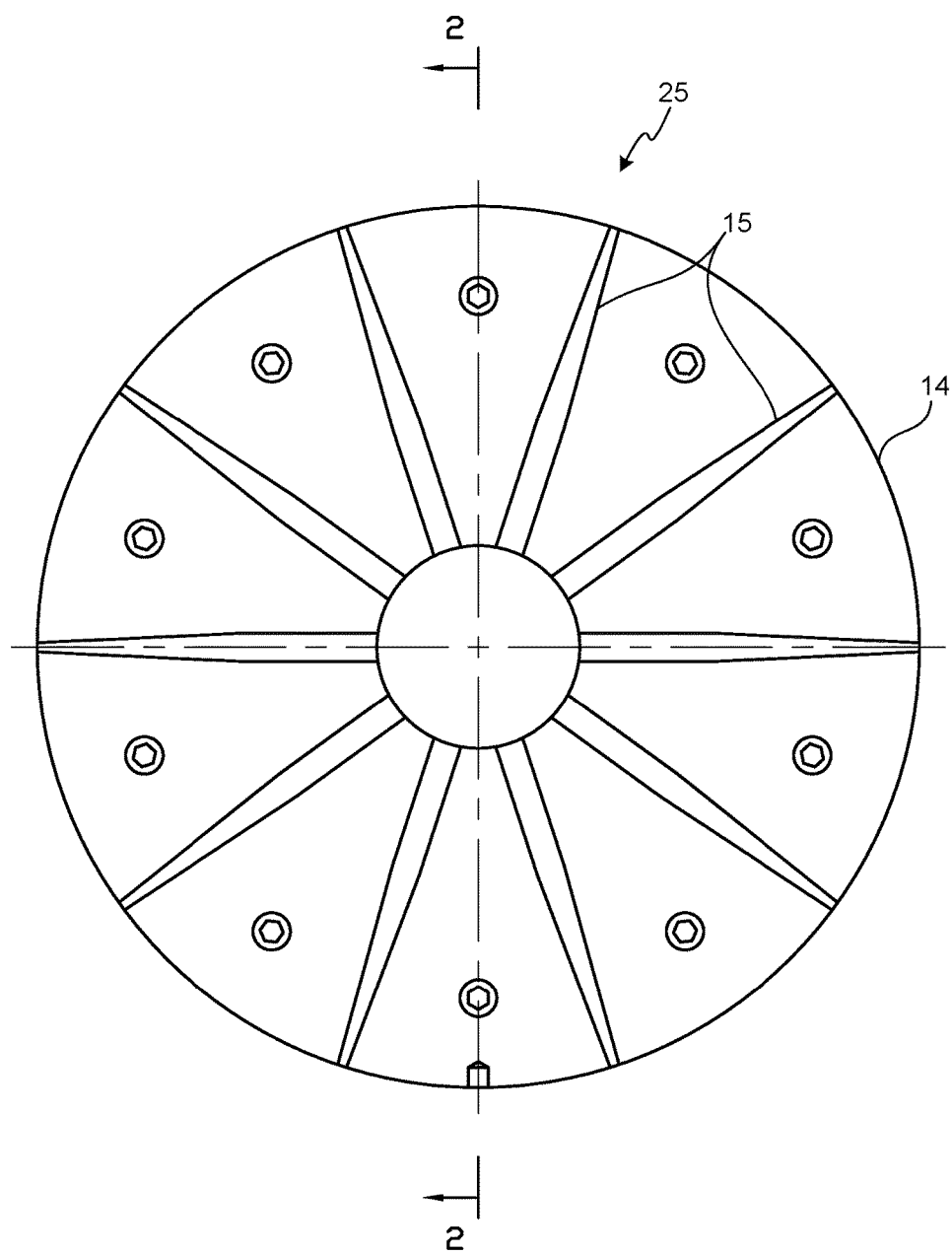
FIG. 1 is a plan view of a prior art magnetic brake.
Figure 2:
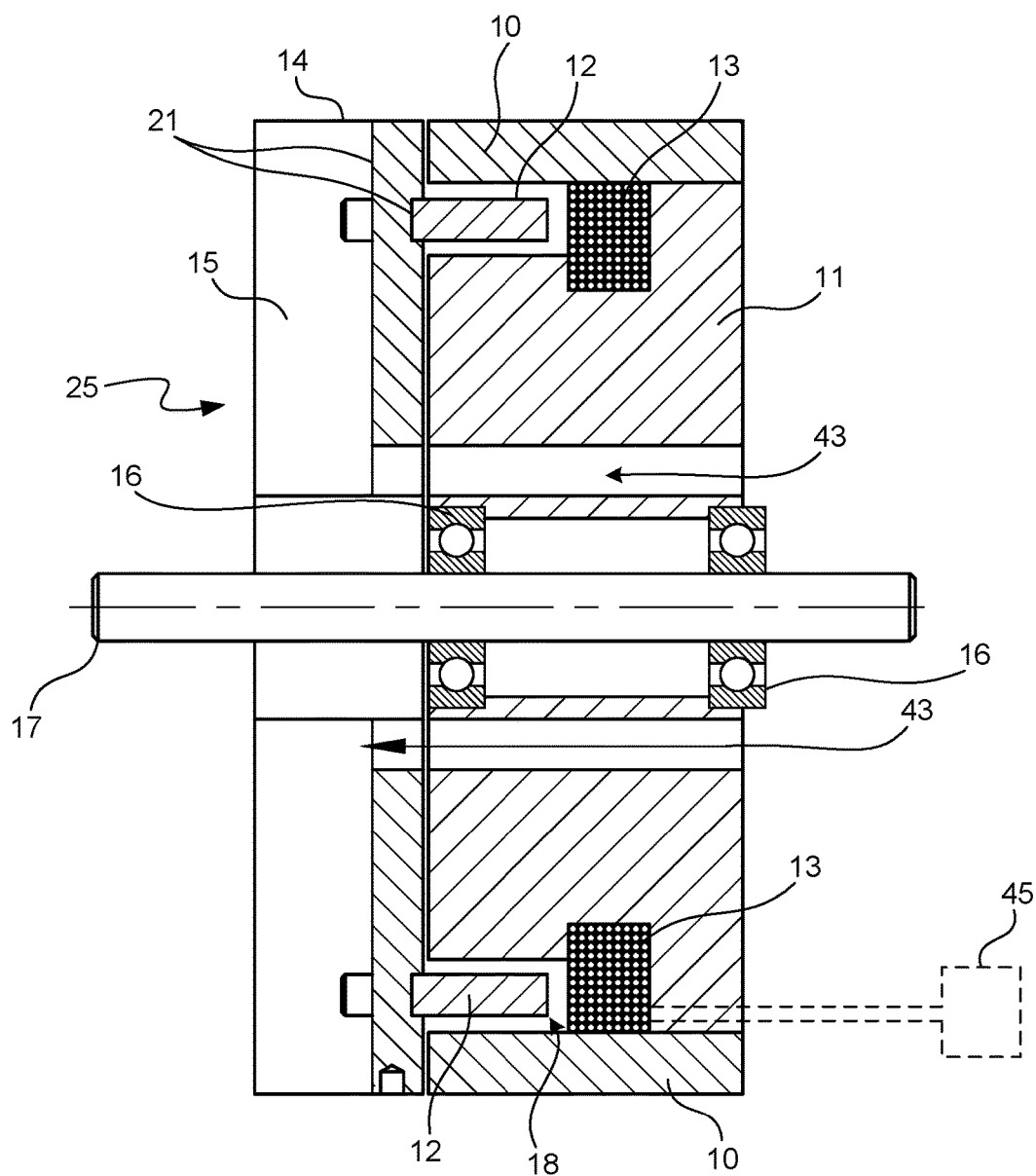
FIG. 2 is a side, sectional view of the magnetic brake taken through plane 2-2 of FIG. 1.
Figure 3:
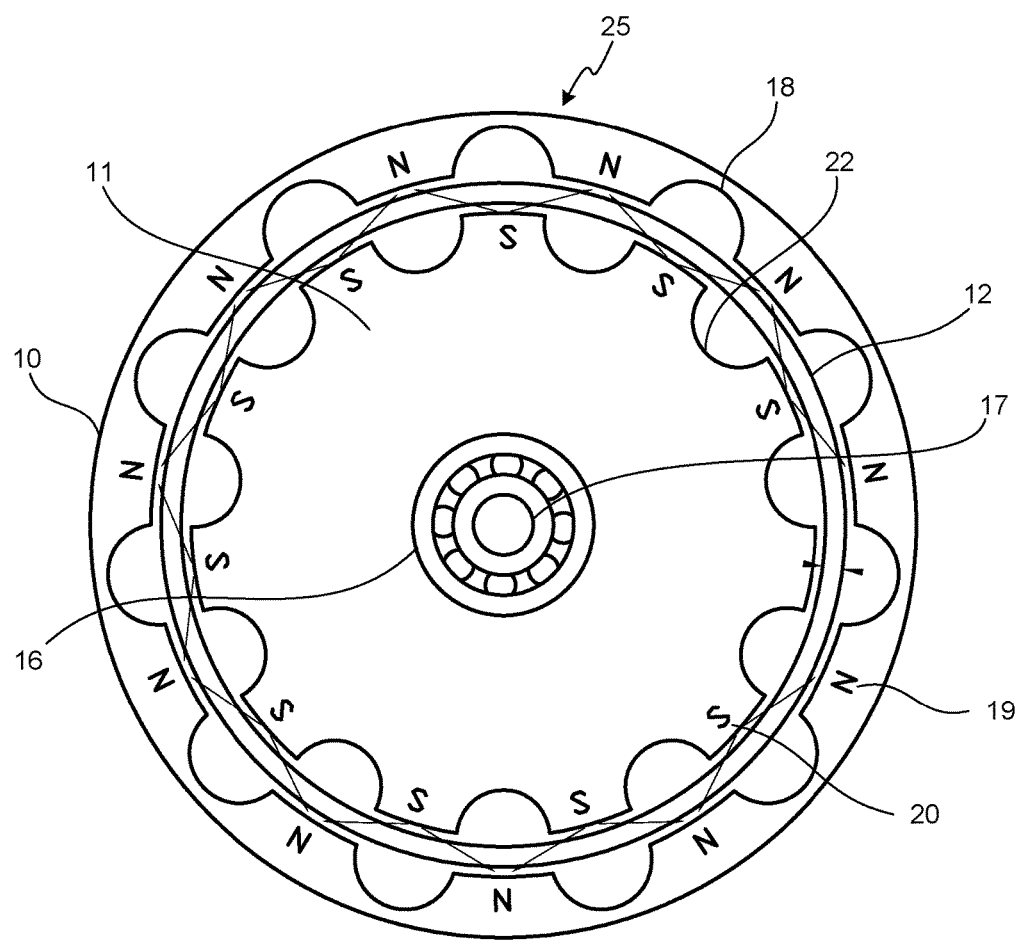
FIG. 3 is an alternative section view.

Turning now in detail to the drawings, FIGS. 1-3 show a prior art brake 25 as described in U.S. Pat. No. 8,857,578, incorporated herein by reference. The brake 25 includes an inner stator 11, an outer stator 10 and a drag ring 12 attached to a drag plate 21. A coil 13 between the inner and outer stators is connected to a current source 45 shown in FIG. 2. An impeller 14 is attached to the drag plate 21. The impeller 14 may be made of a material having high thermal conductivity, such as copper or aluminum. The drag plate is rotatably supported on a shaft 17 via bearings 16. The shaft is connected to a motor or other rotating member (not shown) that the brake 25 stops from rotating or otherwise controls. A drag ring 12 is attached to the drag plate 21 with the drag ring 12 positioned within a circumferential slot 18 between the stators and facing the coil 13. As shown in FIG. 3, the inner and outer stators 11 and 10 may have scallops 22 and 18, to concentrate the magnetic field. As the drag ring 12 passes between the North 19 and South 20 poles, the magnetic domains of the drag ring reverse. This causes a drag or energy loss.

When the brake 25 is activated, i.e., current is applied to the coil 13 and the drag ring 12 is rotating, energy is dissipated as heat in the drag ring 12. The temperature of the drag ring 12 can exceed 300° C. (572° F.). Accordingly, dissipating heat becomes significant. The brake 25 cools the drag ring 12 through conduction of heat from the drag ring 12 to the impeller 14 and from there into the cooling vanes 15 shown in FIGS. 1 and 2. Air flowing over the drag ring 12 also cools the drag ring via convection. Convection also occurs via air flowing though vent holes 43 through inner stator 11. External brake surfaces provide cooling via radiation. To maximize radiation heat transfer, the emissivity, i.e., the relative ability of surfaces to radiate energy, of the brake surfaces should as high as possible. A black surface has a much higher emissivity than a reflective light colored surface. Ferrous components of the brake 25 may have a black oxide coating and aluminum components may have a black anodize surface finish, to increase emissivity. Although the brake 25 has performed well, it has a limited power output.

Figure 4:
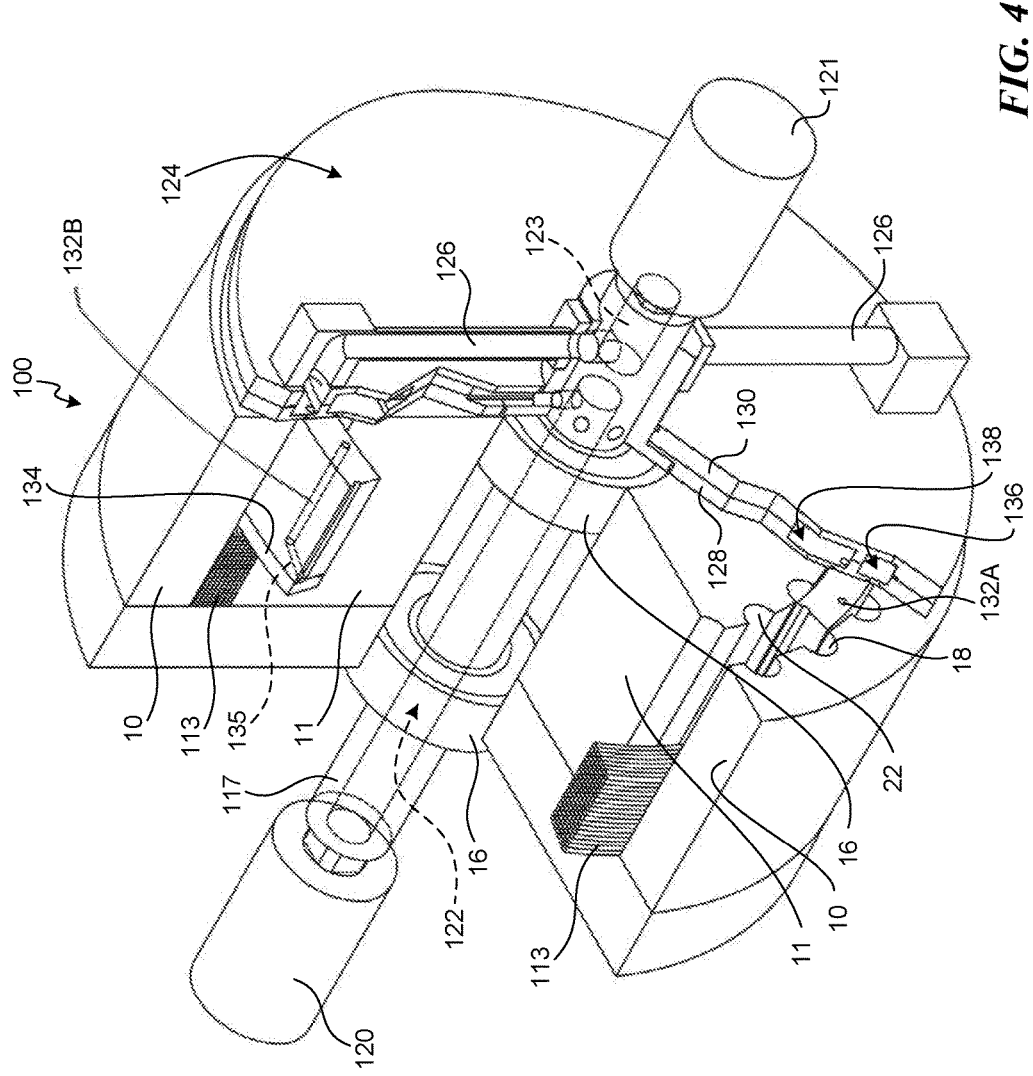
FIG. 4 is perspective view of an improved water cooled brake.
Figure 5:
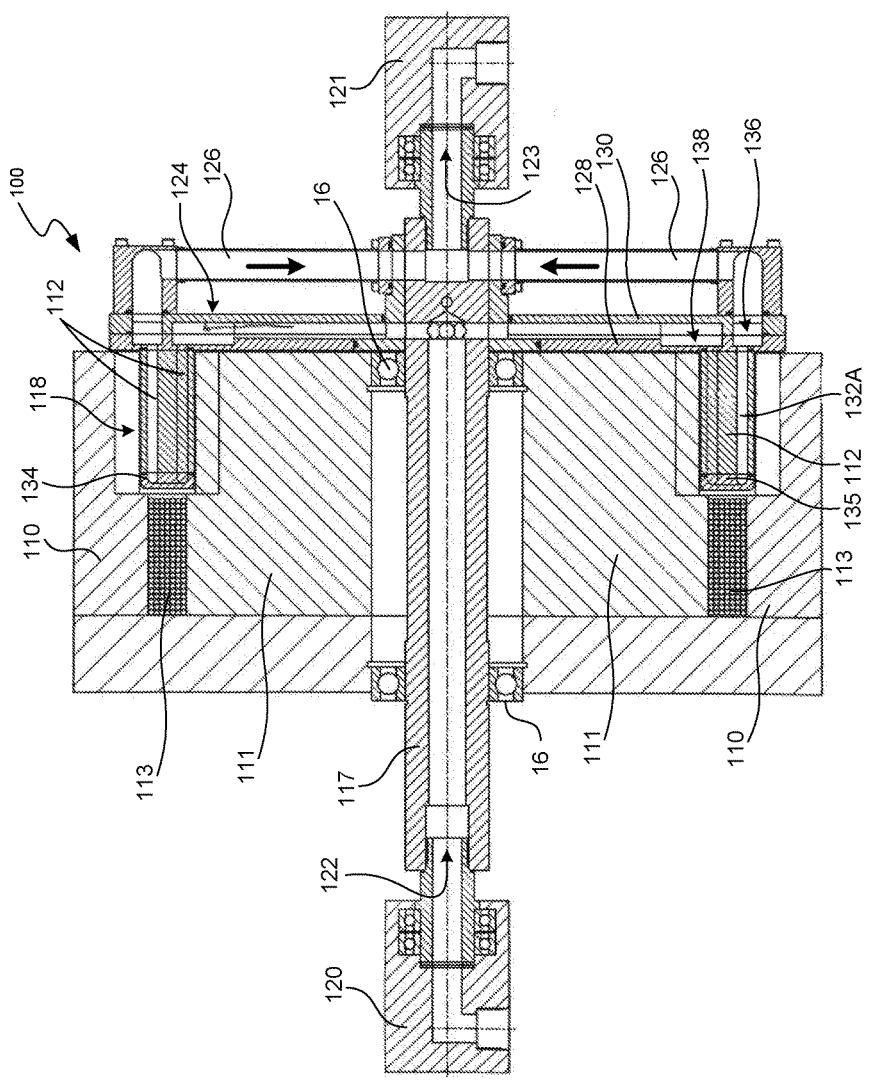
FIG. 5 is a section view of the brake shown in FIG. 4.

Turning to FIGS. 4 and 5, an improved brake 100 has an outer stator 110 surrounding an inner stator 111 with a circumferential slot 118 between the outer stator and the inner stator. A coil 113 is provided in the inner stator 111 adjacent to the circumferential slot 118. A drag plate assembly 124 is rigidly attached to a rotatable shaft 117 which extends centrally through the inner stator 111. A drag ring 112 is attached to the drag plate assembly 124 and extends into the circumferential slot 118. A first set of through holes 132A extend through the drag ring 112 on an outer diameter. A second set of through holes 132B extend through the drag ring 112 on an inner diameter. The through holes 132A and 132B are parallel to the axis of the shaft 117. The through holes 132A and 132B may be equally spaced apart around the circumference of the drag ring 112. Typically, a total of 20 to 200 through holes 132A and 132B may be used, with hole diameters ranging from about 0.06 to 0.2 inches (1.5 to 5 mm) in diameter, depending on the specific design.

Referring still to FIGS. 4 and 5, a first bore 122 extends from a first rotary coupling 120 through the shaft and into a first chamber 136 formed between a first plate 128 and a second plate 130 of the drag plate assembly 124. The first end of each of the outer through holes 132A (at the first side of the drag ring 112 closest to the drag plate assembly 124) connects into the first chamber 136. The first end of each of the inner through holes 132B at the first side of the drag ring assembly 124 connects into a second chamber 138 also formed between the first plate 128 and the second plate 130 of the drag plate assembly 124. A reversal plate 134 is attached and sealed onto the second side of the drag ring 112. The reversal plate 134 has grooves or slots 135 connecting the second ends of the inner and outer through holes 132B and 132A, so that each pair of adjacent inner and outer through holes and a slot 135 provides a continuous flow path from the first chamber 136 to the second chamber 138.

Figure 6:
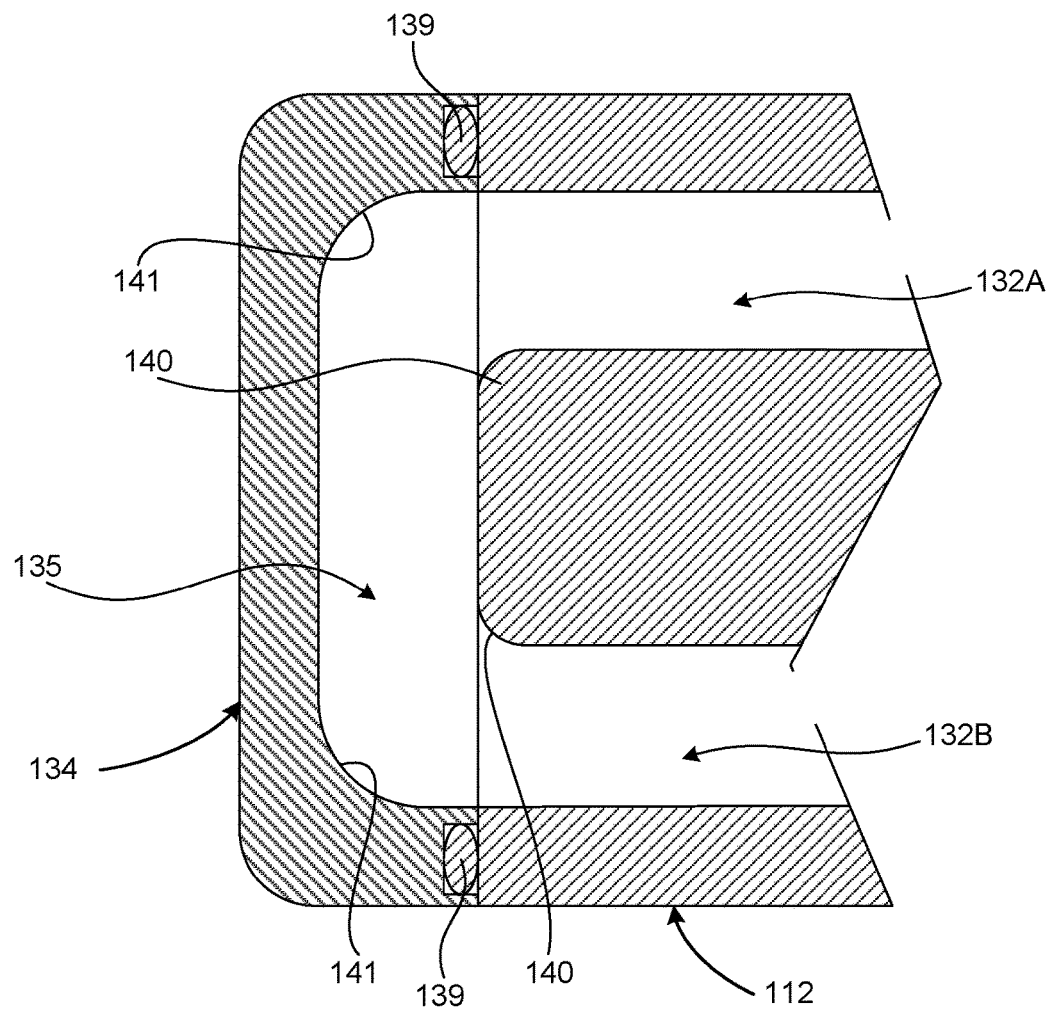
FIG. 6 is an enlarged section view of the reversal plate shown in FIG. 5.

As shown in FIG. 6, the reversal plate 134 and the drag ring 112 are preferably made of the same or similar material to avoid relative changes in dimension between them over a wide range of operating temperatures, and to insure similar magnetic properties such that the heat generated per unit volume of material is similar to that generated in the drag ring.

Since the liquid coolant in the groove 135 and the through holes 132A and 132B is always under pressure relative to the ambient pressure, the interface must be sealed. This may be achieved via an o-ring 139, a sealing compound such as Permatex™ sealant or other similar sealing methods. The seal between the reversal plate 134 and the drag ring 112 should be somewhat flexible. The temperatures of the reversal plate 134 and the drag ring 112 for various reasons will never be the same. Consequently due to thermal expansion there will some movement between reversal plate and the drag ring and a non-flexible seal may crack and cause the liquid coolant to escape.

In order to obtain the least resistance to flow, as shown in FIG. 6, both the through holes 132A and 132B and the groove or slot 135 have radiused corners 140 and interior edges 141. These corners and edges may be visualized by taking a hose with the same diameter as the through holes 132A and 132B and bending it into a "U", which would ideally have the shape of the through holes 132 and the slot 135.

The second chamber 138 is connected to a second bore 123 in the shaft 117 via radial tubes 126. A second rotary coupling 121 at the second end of the shaft 117 has a flow port connecting into the second bore 123.

In use, water or other liquid coolant is pumped through the drag ring 112 to cool the brake 100. Specifically, water enters into the first rotary coupling 120, flows through the first bore 122 and into the first chamber 136. From the first chamber 136 the water flows through the outer through holes 132A, with the flow reversing direction via the slots 135 in the reversal plate 134, and the water then flowing through the inner through holes 132B and into the second chamber 136. Hence the water flows in a U-shaped path within the drag ring 112. From there the water flows through the radial tubes 126 into the second bore 123 and then out of the brake 100 via the second rotary coupling 121.

The rotary couplings 120 and 121 maintain a liquid seal around the rotating shaft 117. Pressure tight seals may be formed between the components of the brake 100 via O-rings or adhesives. To avoid corrosion and mineral deposits, distilled water with a rust inhibitor may be used. In this case, the heated water flowing out of the brake may be routed through a heat exchanger and then recycled through the brake 100. Flow rates generally range from about 1 to 50 gallons per minute (4 to 200 liter/minute). The brake may also be operated for short time intervals without water flow, using the thermal capacity of the drag ring to store the dissipated energy. The brake may be operated at temperatures above the boiling point of water at higher than ambient pressure. Consequently, the entire water flow path may be under pressure.

In the example shown in FIGS. 4 and 5, the brake 100 having a 100 HP (75 kW) capacity is about 10 inches (25 cm) wide, with an outside diameter of 17.5 inches (45 cm). Of course, higher capacity brakes may be provided, generally with larger dimensions. As used here connected relative to the liquid flow path means fluidly connected and not necessarily also directly mechanically connected.

Thus, novel apparatus and methods have been shown and described. Various changes and substitutions may of course be made without departing from the spirit and scope of the invention. The invention, therefore, should not be limited except by the following claims and their equivalents.

The invention claimed is:

1. A magnetic brake comprising:
   an outer stator surrounding an inner stator with a circumferential slot between the outer stator and the inner stator;
   a coil adjacent to the circumferential slot;
   a shaft extending centrally through the inner stator;
   a first rotary coupling at a first end of the shaft;
   a second rotary coupling at a second end of the shaft;
   a drag plate assembly attached to the shaft;
   a drag ring on the drag plate assembly, with the drag ring extending into the circumferential slot, and with the drag ring including a plurality of through holes; and
   a liquid flow path extending through the first rotary coupling, the shaft, the plurality of holes in the drag ring, and through the second rotary coupling.

2. The brake of claim 1 with the plurality of holes including a first plurality of through holes arranged on an outer diameter, and a second plurality of through holes arranged on an inner diameter.

3. The brake of claim 2 further including a reversal plate attached to the drag ring, with the reversal plate having a plurality of slots, and with each of the slots connecting with one of the through holes of the first plurality of through holes, and also connecting with one of the through holes of the second plurality of through holes.

4. The brake of claim 3 with the reversal plate attached to the drag ring by a flexible seal.

5. The brake of claim 3 with the reversal plate and the drag ring comprising the same material.

6. The brake of claim 3 with the first and second plurality of through holes and the plurality of slots forming U-shaped flow paths through the drag ring.

7. The brake of claim 6 with the through holes and slots having rounded corners and edges to reduce resistance to flow.

8. The brake of claim 3 with the drag plate assembly including a first plate and a second plate, with a first and a second chamber formed between the first plate and the second plate, and with a first end of each of the first plurality of holes connecting into the first chamber, and with the first end of each of the second plurality of holes connecting into the second chamber.

9. The brake of claim 3 with the liquid flow path including a first bore connecting into the first rotary coupling and a second bore connecting into the second rotary coupling, with the first bore connecting into the first chamber and with the second bore connecting into the second chamber.

10. The brake of claim 9 with further including at least two radial tubes connecting the second chamber to the second bore.

11. The brake of claim 3 with the reversal plate comprising a first material having a first coefficient of thermal expansion and the drag ring comprising a second material having a second coefficient of thermal expansion, and with the second coefficient of thermal expansion equal to 99% to 101% of the first coefficient of thermal expansion.

12. The brake of claim 3 with the reversal plate sealed to the drag ring with O-rings.

13. The brake of claim 3 with the reversal plate sealed to the drag ring with a sealant or a gasket.

14. A magnetic brake system, comprising:
   a liquid cooled magnetic brake, including:
      an outer stator surrounding an inner stator with a circumferential slot between the outer stator and the inner stator;
      a coil adjacent to the circumferential slot;
      a shaft extending centrally through the inner stator;
      a first rotary coupling at a first end of the shaft;
      a second rotary coupling at a second end of the shaft;
      a drag plate assembly attached to the shaft;
      a drag ring on the drag plate assembly, with the drag ring extending into the circumferential slot, and with the drag ring including a plurality of through holes; and
   a liquid supply;
   a pump connected to a supply port of the liquid supply;
   an inflow line connecting the pump to the first rotary coupling; and an outflow line connecting the second rotary coupling to a return port of the liquid supply.

* * * * *